United States Patent
Somheil

(10) Patent No.: US 12,017,693 B2
(45) Date of Patent: Jun. 25, 2024

(54) CART DEVICE

(71) Applicant: Ralph D. Somheil, Sumter, SC (US)

(72) Inventor: Ralph D. Somheil, Sumter, SC (US)

( * ) Notice: Subject to any disclaimer, the term of this patent is extended or adjusted under 35 U.S.C. 154(b) by 0 days.

(21) Appl. No.: 17/706,813

(22) Filed: Mar. 29, 2022

(65) Prior Publication Data
US 2022/0315080 A1 Oct. 6, 2022

Related U.S. Application Data

(60) Provisional application No. 63/169,475, filed on Apr. 1, 2021.

(51) Int. Cl.
| | |
|---|---|
| *B62B 3/00* | (2006.01) |
| *B60C 5/00* | (2006.01) |
| *B62B 3/10* | (2006.01) |
| *B62B 5/00* | (2006.01) |
| *H01M 10/46* | (2006.01) |

(52) U.S. Cl.
CPC ........... *B62B 3/002* (2013.01); *B60C 5/00* (2013.01); *B62B 3/001* (2013.01); *B62B 3/102* (2013.01); *B62B 5/0033* (2013.01); *H01M 10/465* (2013.01); *B62B 2202/52* (2013.01)

(58) Field of Classification Search
CPC ......... B62B 3/002; B62B 3/001; B62B 3/102; B62B 5/0033; B62B 2202/52; B62B 5/0013; B62B 5/0046; B62B 3/007; B62B 5/0079; B62B 2207/00; B62B 2207/02; B62B 5/0076; B60C 5/00; H01M 10/465
See application file for complete search history.

(56) References Cited

U.S. PATENT DOCUMENTS

| | | | | |
|---|---|---|---|---|
| 5,380,022 A | * | 1/1995 | Dennis | B62B 3/02 280/47.35 |
| 5,857,695 A | * | 1/1999 | Crowell | B62B 3/007 280/47.11 |
| 5,876,047 A | * | 3/1999 | Dennis | B62B 3/007 280/47.35 |
| 7,210,545 B1 | * | 5/2007 | Waid | B62B 3/12 180/19.1 |
| 7,762,363 B1 | * | 7/2010 | Hirschfeld | B60K 1/04 280/651 |

(Continued)

FOREIGN PATENT DOCUMENTS

WO WO-2011003413 A1 * 1/2011 ............... B62B 1/26

*Primary Examiner* — James A Shriver, II
*Assistant Examiner* — Ian Bryce Shelton
(74) *Attorney, Agent, or Firm* — Brennan, Manna & Diamond, LLCx

(57) ABSTRACT

The present invention relates to a cart device primarily comprised of a body, at least one wheel, and at least one axle. In one embodiment, the device can be manually pulled using a handle. In another embodiment, the device has a motor that is powered by a battery and can be controlled by a remote such that the device can propel itself. In various embodiments, the wheel of the device can be optimized for various terrain such as sand, wherein said embodiment features a smooth and inflatable wheel. Further, the device is comprised of an umbrella holder that receives an umbrella and allows the device to act as a base for the umbrella. The device is also comprised of a tow hitch and a tow bar that allows the device to be pulled by a secondary vehicle such as, but not limited to, a golf cart.

5 Claims, 2 Drawing Sheets

(56) References Cited

U.S. PATENT DOCUMENTS

| | | | |
|---|---|---|---|
| 8,327,963 B1* | 12/2012 | Faulkingham | B62B 3/04 180/9.1 |
| 8,453,771 B1* | 6/2013 | Hirschfeld | B60L 8/003 180/19.1 |
| 8,746,377 B1* | 6/2014 | Dunbar | B62B 5/0003 280/30 |
| 9,731,779 B2* | 8/2017 | Lamb | B62D 51/001 |
| 11,084,513 B1* | 8/2021 | Tschiggfrie | B62B 3/02 |
| 11,235,794 B1* | 2/2022 | Ciccarelli | B62B 3/002 |
| 2002/0017411 A1* | 2/2002 | Weiss | A45C 11/02 180/167 |
| 2002/0095947 A1* | 7/2002 | Treppedi | B62B 13/18 62/457.3 |
| 2003/0193156 A1* | 10/2003 | Norris | B62K 27/003 280/204 |
| 2005/0228547 A1* | 10/2005 | McDonnell | A63B 71/06 701/1 |
| 2011/0025005 A1* | 2/2011 | Howell | B62B 7/10 280/47.24 |
| 2015/0021106 A1* | 1/2015 | LaRosa | A45C 11/20 180/2.2 |
| 2015/0162647 A1* | 6/2015 | Chen | H01M 10/465 417/234 |
| 2015/0225007 A1* | 8/2015 | Knepp | B62D 63/06 280/47.18 |
| 2015/0239484 A1* | 8/2015 | Mericle | B62B 5/0086 280/35 |
| 2015/0352910 A1* | 12/2015 | Taniguchi | B60C 17/0009 152/517 |
| 2016/0348954 A1* | 12/2016 | McBeth | B62B 1/20 |
| 2017/0043800 A1* | 2/2017 | Chaloux | F25D 11/00 |
| 2017/0190344 A1* | 7/2017 | Bengtzen | B62B 5/0079 |
| 2018/0237046 A1* | 8/2018 | Bovino | B62B 5/0013 |
| 2018/0257439 A1* | 9/2018 | Kouda | B60C 9/08 |
| 2018/0334180 A1* | 11/2018 | Lambert | B62B 5/00 |
| 2019/0118694 A1* | 4/2019 | Melrose | B63B 27/16 |
| 2019/0176543 A1* | 6/2019 | Hoshiba | B60C 17/0009 |
| 2019/0193495 A1* | 6/2019 | Floyd | B60D 1/1675 |
| 2020/0001907 A1* | 1/2020 | Scarth | B62B 5/061 |
| 2020/0317243 A1* | 10/2020 | Leroux-Gamelin | B62B 5/067 |
| 2021/0276603 A1* | 9/2021 | Knepp | B62B 5/04 |
| 2021/0380153 A1* | 12/2021 | Butler | B62B 5/0046 |
| 2022/0089207 A1* | 3/2022 | Gavin | B62B 3/025 |

* cited by examiner

CART DEVICE

CROSS-REFERENCE TO RELATED APPLICATION

The present application claims priority to, and the benefit of, U.S. Provisional Application No. 63/169,475 which was filed on Apr. 1, 2021, and is incorporated herein by reference in its entirety.

FIELD OF THE INVENTION

The present invention relates generally to the field of carts and wagons. More specifically, the present invention relates to a cart device primarily comprised of a body, at least one wheel, and at least one axle. In one embodiment, the device can be manually pulled using a handle. In another embodiment, the device has a motor that is powered by a battery and can be controlled by a remote such that the device can propel itself. In various embodiments, the wheel of the device can be optimized for various terrain such as sand, wherein said embodiment features a smooth and inflatable wheel. Further, the device is comprised of an umbrella holder that receives an umbrella and allows the device to act as a base for the umbrella. The device is also comprised of a tow hitch and a tow bar that allows the device to be pulled by a secondary vehicle such as, but not limited to, a golf cart. Accordingly, the present disclosure makes specific reference thereto. Nonetheless, it is to be appreciated that aspects of the present invention are also equally applicable to other like applications, devices and methods of manufacture.

BACKGROUND

Transporting multiple heavy items such as beach accessories, groceries, etc. can be incredibly difficult when trying to do so by hand. As a result, individuals may opt to use a hand cart or wagon to transport their items. However, standard wagon or cart wheels may be unable to easily traverse terrain like sand. Therefore, individuals may be forced to hand carry multiple heavy items to and from a beach location, which can be incredibly unpleasant. Further, existing carts and wagons must be manually pulled, which may be extremely difficult given the terrain or mobility/strength level of the user.

Therefore, there exists a long-felt need in the art for an improved cart device. There also exists a long-felt need in the art for a cart device that can easily traverse sand and other rough or uncommon terrain. Further, there exists a long-felt need in the art for a cart device that does not need to be manually pulled.

The subject matter disclosed and claimed herein, in one embodiment thereof, comprises a cart device primarily comprised of a body, at least one wheel, and at least one axle. In one embodiment, the device can be manually pulled using a handle. In another embodiment, the device has a motor that is powered by a battery and can be controlled by a remote such that the device can propel itself. In various embodiments, the wheel of the device can be optimized for various terrain such as sand, wherein said embodiment features a smooth and inflatable wheel. Further, the device is comprised of an umbrella holder that receives an umbrella and allows the device to act as a base for the umbrella. The device is also comprised of a tow hitch and a tow bar that allows the device to be pulled by a secondary vehicle such as, but not limited to, a golf cart.

In this manner, the cart device of the present invention accomplishes all of the forgoing objectives and provides an improved cart device. The wheels of the device allow the device to easily traverse sand and other rough or uncommon terrain. Further, a motorized embodiment of the cart device that does not need to be manually pulled by a user.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a cart device primarily comprised of a body, at least one wheel, and at least one axle. In the preferred embodiment, all components of the device are manufactured from a durable metal, and wherein the body is preferably rectangular in shape. The body is preferably made of a bottom wall, a pair of vertical side walls, a vertical front wall, and a vertical rear wall that together form an interior surface. A variety of objects can then be stored and transported on/within the interior surface. At least one axle is preferably attached to the bottom wall, wherein at least one wheel is preferably connected to the axle. In differing embodiments, the wheel may be a standard rubber-treaded wheel, a run-flat wheel, or any type of vehicle wheel. In a further embodiment, the wheel may be inflatable and smooth for optimized traversing of sand. The walls may further be comprised of at least one handle that allows the device to be manually pulled. At least one umbrella holder may also be present on at least one wall, wherein the holder receives an umbrella such that the device serves as a base for the umbrella.

In one embodiment, the device can be moved by being manually pulled by the user using the handle. In a differing embodiment, the device is powered by at least one motor which is preferably electric and is powered by at least one battery. The battery may be recharged by at least one solar panel located on any surface of the device. In a motorized embodiment, at least one drive shaft is connected to the axle and the motor such that the motor causes the drive shaft to spin which then spins the axle and wheels to propel the device. In one embodiment, the motor is in wireless electrical communication with a remote that can control the motor via at least one button. The remote preferably allows the user to control the steering, speed, and travel direction of the device such that the device need not be manually pulled.

The device can also be pulled by a secondary vehicle such as, but not limited to, a golf cart using at least one tow hitch that receives at least one tow bar. The tow bar has a first end that attaches to the tow hitch and a second end that attaches to the secondary vehicle. In various embodiments, either or both ends may be any conventional male or female hitch shape known in the art. In a differing embodiment, the first end may be slotted and the second end may be a female hitch.

Accordingly, the cart device of the present invention is particularly advantageous as it provides improved cart device. The device can easily traverse sand and other terrain and does not need to be manually pulled. In this manner, the cart device overcomes the limitations of existing carts and wagons known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
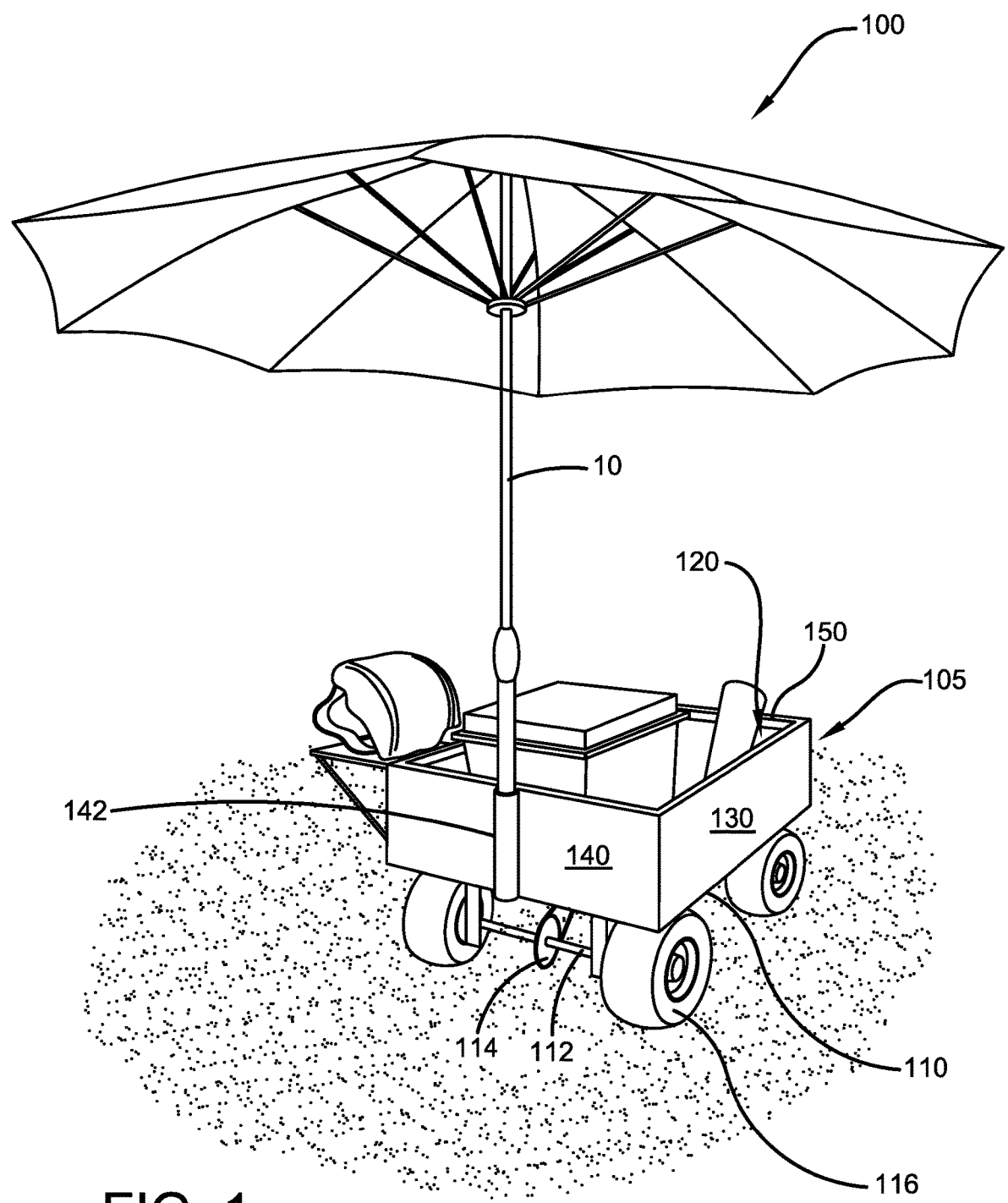
FIG. 1 illustrates a perspective view of one potential embodiment of a cart device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for an improved cart device. There also exists a long-felt need in the art for a cart device that can easily traverse sand and other rough or uncommon terrain. Further, there exists a long-felt need in the art for a cart device that does not need to be manually pulled.

The present invention, in one exemplary embodiment, is comprised of a cart device primarily comprised of a body, at least one wheel and at least one axle. In the preferred embodiment, all components of the device are manufactured from a durable metal and the body is preferably rectangular in shape. The body is preferably made of a bottom wall, a pair of vertical side walls, a vertical front wall, and a vertical rear wall that together form an interior surface. A variety of objects can then be stored and transported within the interior surface. At least one axle is preferably attached to the bottom wall, wherein at least one wheel is preferably connected to the axle. In differing embodiments, the wheel may be a standard rubber-treaded wheel, a run-flat wheel, or any type of vehicle wheel. The wheel may also be inflatable and smooth for optimized traversing of sand. The walls may further be comprised of at least one handle that allows the device to be manually pulled. At least one umbrella holder may also be present on a wall, wherein the holder receives an umbrella such that the device serves as a base for the umbrella.

A non-powered embodiment of the device can be moved by being manually pulled by the user using the handle. In a differing embodiment, the device is powered by at least one motor which is preferably electric and is powered by at least one battery. The battery may be recharged by at least one solar panel located on any surface of the device. In a motorized embodiment, at least one drive shaft is connected to the axle and the motor such that the motor causes the drive shaft to spin, which then spins the axle and wheels to propel the device. In one embodiment, the motor is in wireless electrical communication with a remote that can control the motor via at least one button. The remote preferably allows the user to control the steering, speed, and travel direction of the device such that the device need not be manually pulled.

The device can also be pulled by a secondary vehicle such as, but not limited to, a golf cart using at least one tow hitch that receives at least one tow bar. The tow bar has a first end that attaches to the tow hitch and a second end that attaches to the secondary vehicle. In various embodiments, either or both ends may be any conventional male or female hitch shape known in the art. In a differing embodiment, the first end may be slotted and the second end may be a female hitch.

Referring initially to the drawings, FIG. 1 illustrates a perspective view of one potential embodiment of a cart device 100 of the present invention in accordance with the disclosed architecture. The device 100 is primarily comprised of a body 105, at least one wheel 116 and at least one axle 112. In the preferred embodiment, all components of the device 100 are manufactured from a durable metal such as, but not limited to stainless steel or aluminum, unless otherwise specified. However, in one embodiment all components of the device 100 may be manufactured from a rigid plastic material that is UV-resistant and waterproof. The body 105 is preferably rectangular in shape and is comprised of a bottom wall 110, a pair of vertical side walls 130, a vertical front wall 140, and a vertical rear wall 150 that together form an interior surface 120. A variety of objects can then be stored and transported on/within the interior surface 120 such as, but not limited to, coolers, beach supplies, food, goods, etc.

At least one axle 112 is preferably attached to the bottom wall 110. At least one wheel 116 is preferably connected to the axle 112. In differing embodiments, the wheel 116 may be a standard rubber-treaded wheel, a run-flat wheel, or any type of vehicle wheel. In a further embodiment, the wheel 116 may be inflatable and smooth for optimized traversing of sand. In one embodiment the wheel 116 may also be buoyant.

A side wall 130, front wall 140, and/or rear wall 150 may further be comprised of at least one handle 200 that allows the device 100 to be manually pulled. At least one umbrella holder 142 may also be present on a side wall 130, front wall 140, and/or rear wall 150, wherein the umbrella holder 142 has a continuous opening 144 that can receive an umbrella 10 such that the device 100 serves as a base for the umbrella. The holder 142 may further be comprised of at least one fastener 146 such as, but not limited to, a screw, bolt, dial, etc. that allows the umbrella 10 to remain secured within the holder 142 by being secured against the umbrella 10 while the umbrella 10 is within the holder 142.

In one embodiment, the device 100 can be moved by being manually pulled by the user using the handle 200. In a differing embodiment, the device 100 is powered by at least one motor 180. The motor 180 is preferably electric and is powered by at least one battery 182. The battery 182 may be a disposable battery 182 or a rechargeable battery 182 in the form of an alkaline, nickel-cadmium, nickel-metal hydride battery 182, etc. such as any 3V-12 volts DC battery 182 or other conventional battery 182 such as A, AA, AAA, etc. that supply power to the device 100. Throughout this specification the terms "battery" and "batteries" may be used interchangeably to refer to one or more wet or dry cells or batteries 182 of cells in which chemical energy is converted into electricity and used as a source of DC power. References to recharging or replacing batteries 182 may refer to recharging or replacing individual cells, individual batteries 182 of cells, or a package of multiple battery cells as is appropriate for any given battery 182 technology that may be used. Additionally, the battery 182 may be recharged by at least one solar panel 184 located on any surface of the device 100. In various embodiments, the solar panel 184 may be comprised of, but not limited to, monocrystalline silicon, polycrystalline silicon, or a photovoltaic cell film.

In a motorized embodiment, at least one drive shaft 114 is connected to the axle 112 and the motor 180 such that the motor 180 causes the drive shaft 114 to spin, which then spins the axle 112 and wheels 116 to propel the device 100. In one embodiment, the motor 180 is further comprised of at least one transmitter 186. The transmitter 186 is in wireless electrical communication with at least one receiver 194 of at least one remote 190 via Wi-Fi, Bluetooth, radio frequency, etc. such that the remote 190 can control the motor 180 via at least one button 192. The remote 190 preferably allows the user to control the steering, speed, and travel direction of the device 100 such that the device 100 need not be manually pulled.

Figure 2:
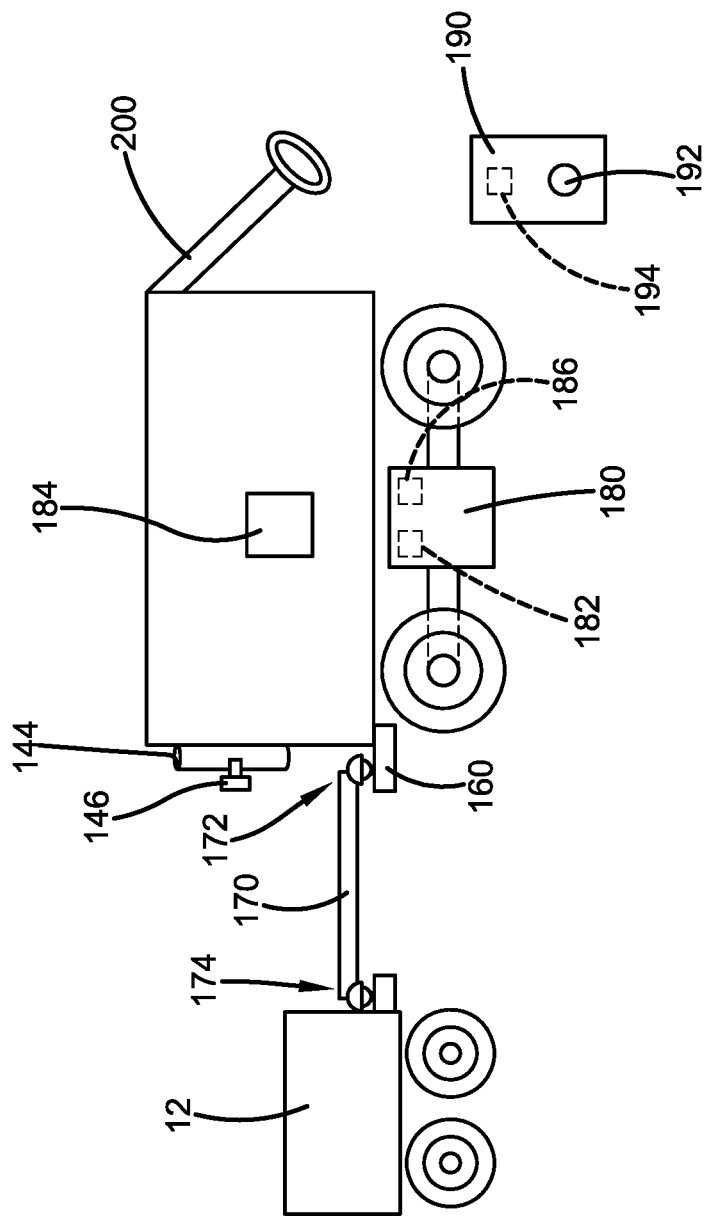
FIG. 2 illustrates a side view of one potential embodiment of a cart device of the present invention while attached to a secondary vehicle in accordance with the disclosed architecture.

As seen in FIG. 2, the device 100 can also be pulled by a secondary vehicle 12 such as, but not limited to, a golf cart. In this embodiment, the device 100 is comprised of at least one tow hitch 160. The tow hitch 160 receives at least one tow bar 170. The bar 170 has a first end 172 that attaches to the tow hitch 160 and a second end 174 that attaches to the secondary vehicle 12. In various embodiments, either or both ends 172,174 may be any conventional male or female hitch shape known in the art. In a differing embodiment, the first end 172 may be slotted and the second end 174 may be a female hitch.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "cart device" and "device" are interchangeable and refer to the cart device 100 of the present invention.

Notwithstanding the forgoing, the cart device 100 of the present invention and its various components can be of any suitable size and configuration as is known in the art without affecting the overall concept of the invention, provided that they accomplish the above-stated objectives. One of ordinary skill in the art will appreciate that the size, configuration and material of the cart device 100 as shown in the FIGS. are for illustrative purposes only, and that many other sizes and shapes of the cart device 100 are well within the scope of the present disclosure. Although the dimensions of the cart device 100 are important design parameters for user convenience, the cart device 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A cart device comprising:
   a body comprising a pair of side walls, front wall, a rear wall, a handle extending from the front wall, and an umbrella holder attached to the rear wall;
   an axle comprised of a rubber-treaded buoyant inflatable wheel;
   a tow hitch;
   a tow bar;
   a motor;
   a battery;
   a photovoltaic cell film solar panel attachable to one of the pair of side walls;
   a drive shaft; and
   a remote configured to control a speed, a direction, and a steering of the cart device; and
   wherein the umbrella holder is a single piece tube configured to serve as a base for an umbrella and comprises a continuous opening for receiving the umbrella and a bolt for securing the umbrella within the umbrella holder; and
   wherein the body is a stainless steel body.

2. The cart device of claim 1, wherein the motor is in wireless electrical communication with the remote.

3. The cart device of claim 1, wherein the solar panel charges the battery.

4. The cart device of claim 1, wherein the motor spins the drive shaft.

5. The cart device of claim 4, wherein the drive shaft spins the wheel.

* * * * *